(12) United States Patent
Koszek (10) Patent No.: US 9,658,858 B2
(45) Date of Patent: May 23, 2017

(54) MULTI-THREADED LOW-LEVEL STARTUP FOR SYSTEM BOOT EFFICIENCY

(71) Applicant: Xilinx, Inc., San Jose, CA (US)

(72) Inventor: Wojciech A. Koszek, Menlo Park, CA (US)

(73) Assignee: XILINX, INC., San Jose, CA (US)

( * ) Notice: Subject to any disclaimer, the term of this patent is extended or adjusted under 35 U.S.C. 154(b) by 418 days.

(21) Appl. No.: 14/055,826

(22) Filed: Oct. 16, 2013

(65) Prior Publication Data

US 2015/0106609 A1   Apr. 16, 2015

(51) Int. Cl.
*G06F 9/44* (2006.01)

(52) U.S. Cl.
CPC .......... *G06F 9/4401* (2013.01); *G06F 9/4405* (2013.01)

(58) Field of Classification Search
CPC ............................ G06F 9/4401; G06F 9/4405
See application file for complete search history.

(56) References Cited

U.S. PATENT DOCUMENTS

| | | | |
|---|---|---|---|
| 6,158,000 A | 12/2000 | Collins | |
| 7,243,221 B1 * | 7/2007 | Ryser | G06F 9/48 713/1 |
| 8,166,289 B2 | 4/2012 | Owens et al. | |
| 8,224,638 B1 | 7/2012 | Shirazi et al. | |
| 2004/0268108 A1 * | 12/2004 | Chen | G06F 15/177 713/1 |
| 2006/0095726 A1 * | 5/2006 | Zaabab | G06F 9/32 712/205 |
| 2006/0149959 A1 | 7/2006 | Rothman et al. | |
| 2011/0126209 A1 | 5/2011 | Housty | |
| 2011/0246759 A1 | 10/2011 | Lai | |
| 2012/0124360 A1 * | 5/2012 | Gueron | G06F 9/4406 713/2 |
| 2012/0246525 A1 * | 9/2012 | Shibata | G11C 16/3431 714/704 |

FOREIGN PATENT DOCUMENTS

WO   WO 00-17750 A1   3/2000

* cited by examiner

*Primary Examiner* — Dennis M Butler
(74) *Attorney, Agent, or Firm* — Kin-Wah Tong; Keith Taboada (57) ABSTRACT

Methods, computer-readable media and devices for executing a plurality of startup instructions are disclosed. For example, a method includes a first processor of a device accessing a plurality of startup instructions in response to a startup of the device. The first processor then executes a first startup instruction of the plurality of startup instructions to perform a first task and executes a second startup instruction of the plurality of startup instructions. The executing the second startup instruction causes the first processor to send a further instruction to a second processor of the device to perform a second task. At least a portion of the first task and at least a portion of the second task are performed at a same time.

21 Claims, 4 Drawing Sheets

MULTI-THREADED LOW-LEVEL STARTUP FOR SYSTEM BOOT EFFICIENCY

FIELD OF THE INVENTION

The present disclosure relates generally to low-level startup functions, and more particularly to devices and processes that use multiple processors to perform the low-level startup functions.

BACKGROUND OF THE INVENTION

System startup typically involves low-level processes which are invoked upon powering on a device. For example, a central processing unit (CPU) may contain a reset vector which stores a location in which the CPU will look for the first instruction to execute after a reset or after being powered on. The address or location pointed to by the reset vector contains instructions and code to execute low-level processes that eventually result in the loading of an operating system or bare-metal application, for instance. These instructions or "stage-0" boot code, are often referred to as BootROM and typically reside in read-only memory (ROM) of the device. The BootROM perform several functions, such as a power on self test (POST), retrieval of a boot loader program or secondary program loader (SPL), which may be referred to as a first stage boot loader (FSBL), decryption and/or authentication of the FSBL, resetting of the memory (e.g., the random access memory (RAM) of the device), loading the FSBL into memory, initialization of programmable logic, and so forth. The FSBL is then responsible for initializing peripherals, bringing the peripherals online, retrieving and loading into memory an image of the operating system from storage (e.g., from a non-volatile memory), and to perform other tasks.

SUMMARY OF THE INVENTION

The present disclosure provides a method for executing a plurality of startup instructions for a device. For example, the method can include a first processor of a device accessing a plurality of startup instructions in response to a startup of the device. The first processor then executes a first startup instruction of the plurality of startup instructions to perform a first task and executes a second startup instruction of the plurality of startup instructions. The executing the second startup instruction causes the first processor to send a further instruction to a second processor of the device to perform a second task. At least a portion of the first task and at least a portion of the second task are performed at a same time.

In various examples: the accessing comprises retrieving the plurality of startup instructions from a non-volatile memory of the device; the accessing comprises retrieving the plurality of startup instructions from a volatile memory of the device; the first task comprises performing a power on self test of the device; the first task comprises retrieving a programmable logic image from a storage device of the device; the first task comprises writing the programmable logic image to a programmable logic portion of the device; the accessing the plurality of startup instructions comprises retrieving the plurality of startup instructions starting at a particular memory location of a non-volatile memory of the device; an address of the particular memory location is stored in a register of the first processor and is accessed by the first processor at the startup of the device; the second task comprises initializing at least a portion of a volatile memory of the device; the initializing the at least a portion of the volatile memory comprises writing a known pattern to the volatile memory; the second task comprises retrieving a programmable logic image from a storage device of the device; and the second task comprises writing the programmable logic image to a programmable logic portion of the device.

The present disclosure also provides an additional method for executing a plurality of startup instructions for a device. For example, the method can include a first processor of the device accessing a first instruction of the plurality of startup instructions in response to a startup of the device and executing the first instruction to perform a first task. The method can also include a second processor of the device accessing a second instruction of the plurality of startup instructions in response to the startup of the device and executing the second instruction to perform a second task. At least a portion of the first task and at least a portion of the second task are performed at a same time.

In various examples: the plurality of startup instructions comprises a BootROM; the plurality of startup instructions comprises a boot loader program; the first task comprises initializing at least a portion of a volatile memory of the device; the initializing the at least a portion of the volatile memory comprises writing a known pattern to the volatile memory; the first task comprises decompressing a boot loader program that is retrieved from a non-volatile memory or a storage device of the device; the first task comprises authenticating the boot loader program; the first task comprises decrypting the boot loader program; the authenticating comprises accessing a hash signature from a storage device of the device and verifying an integrity of the boot loader program using the hash signature; the decrypting comprises accessing a decryption key from a storage device of the device and decrypting the boot loader program using the decryption key; and the startup of the device comprises a power-on event or a reset event.

The present disclosure also provides a non-transitory computer-readable medium that stores a plurality of startup instructions. When executed by a first processor of a device, the instructions cause the first processor to perform the operations which can include: performing a first task comprising an initialization of a memory, in response to a startup of the device and sending a further instruction to a second processor of the device to perform a second task. At least a portion of the first task and at least a portion of the second task are performed at a same time.

In various examples: the same time comprises a time prior to the device operating a first stage boot loader; the second task comprises decompressing a boot loader program that is retrieved from a non-volatile memory or a storage device of the device; the second task comprises authenticating the boot loader program; the second task comprises decrypting the boot loader program; the second task comprises decompressing an operating system image and accompanying data that is retrieved from a non-volatile memory or a storage device of the device; the second task comprises authenticating the operating system image and accompanying data; and the second task comprises decrypting the operating system image and accompanying data.

BRIEF DESCRIPTION OF THE DRAWINGS

Accompanying drawings show exemplary circuits and methods in accordance with one or more aspects of the disclosure; however, the accompanying drawings should not be taken to limit the disclosure to the examples shown, but are for explanation and understanding only.

To facilitate understanding, identical reference numerals have been used, where possible, to designate identical elements that are common to the figures.

DETAILED DESCRIPTION OF THE DRAWINGS

While the following describes various examples in accordance with one or more aspects of the present disclosure, other and further example(s) in accordance with the one or more aspects of the present disclosure may be devised without departing from the scope thereof. Thus, the present disclosure is not limited by the examples that follow, and such examples are provided only by way of illustration.

Nearly all chipsets include a thin layer of low-level startup software burned into the chip structure which is executed when the chip is turned on or when coming out of a reset. This software is often referred to as BootROM, and may be stored in an on-chip read only memory (ROM). Although this software will be referred to herein as BootROM, the present disclosure is not limited to any particular nomenclature, and those skilled in the art will appreciate that various other terms may be used to refer to the same or similar low-level startup software or code. In one example, a processor, e.g., a central processing unit (CPU), upon first receiving power, may access an address stored in a register, which points to a location in the ROM where the BootROM code begins. The processor then accesses the code and begins to execute the instructions. The instructions may relate to several tasks such as performing a power on self test (POST), initializing a memory, e.g., by writing a known pattern to the memory, accessing a boot loader program, e.g., first stage boot loader (FSBL), retrieving a cryptographic key, decrypting and authenticating the FSBL, and loading the FSBL into memory (e.g., random access memory (RAM)). As a further example, when the FSBL is loaded, control of the chip may pass to the FSBL to continue the system startup process. For example, the FSBL may load an operating system and bring peripherals online such as monitors, keyboards, universal serial bus (USB) ports and interfaces, and so forth.

The present disclosure provides for multi-threaded startup sequences which use multiple processors (CPUs), or cores, to complete low-level startup tasks in parallel. In contrast, low-level startup tasks (e.g., BootROM processes) have historically been performed by a single processor, even in multi-core systems. For instance, after a system reset, all processors in the chip jump to the reset vector, which places all processors but one to sleep. The other processers are suppressed until the BootROM is completed by the initial processor and control is passed to the FSBL. In the past, the process of bringing up a system was not that demanding. Thus, in keeping with tradition, the environment for booting a system has remained relatively simple and quiet.

Using multiple cores in accordance with the present disclosure grows the BootROM process in complexity. However, as the number of tasks required to be completed by the BootROM increases, so does the time it takes for the BootROM to complete. For example, Peripheral Component Interconnect Express (PCIe) specifies a critical time to boot a chip on the order of microseconds. If a chip does not complete the startup within the specified time, it is not PCI Express compliant. One way to reduce the time it takes for BootROM to execute, and to meet benchmarks such as PCI Express, is to craft additional accelerators and put them in the chip structure to perform specific functions. However, this type of customization increases design time and verification time. It is also difficult to modify since changes may likely require physical alteration of the chip. On the other hand, the present disclosure can accelerate the various tasks via the BootROM itself, which is software and hence easier to write and to verify. As an example, the BootROM may be "multi-threaded" and may assign different tasks to different processors to complete in parallel. For instance, a first core can retrieve and decrypt an image of a FSBL from a storage location, while another core can initialize a memory (e.g., operating RAM). After initialization, the image of the FSBL can be loaded into the memory. These tasks can be completed in parallel in less time than if only a single core were to initialize the memory, retrieve and decrypt an image of a FSBL and load the image of the FSBL into the memory in a serial fashion. In addition, it is a more efficient solution than custom accelerators because CPU interfaces are presently more advanced than the examples of customized accelerators which are presently known.

Figure 1:
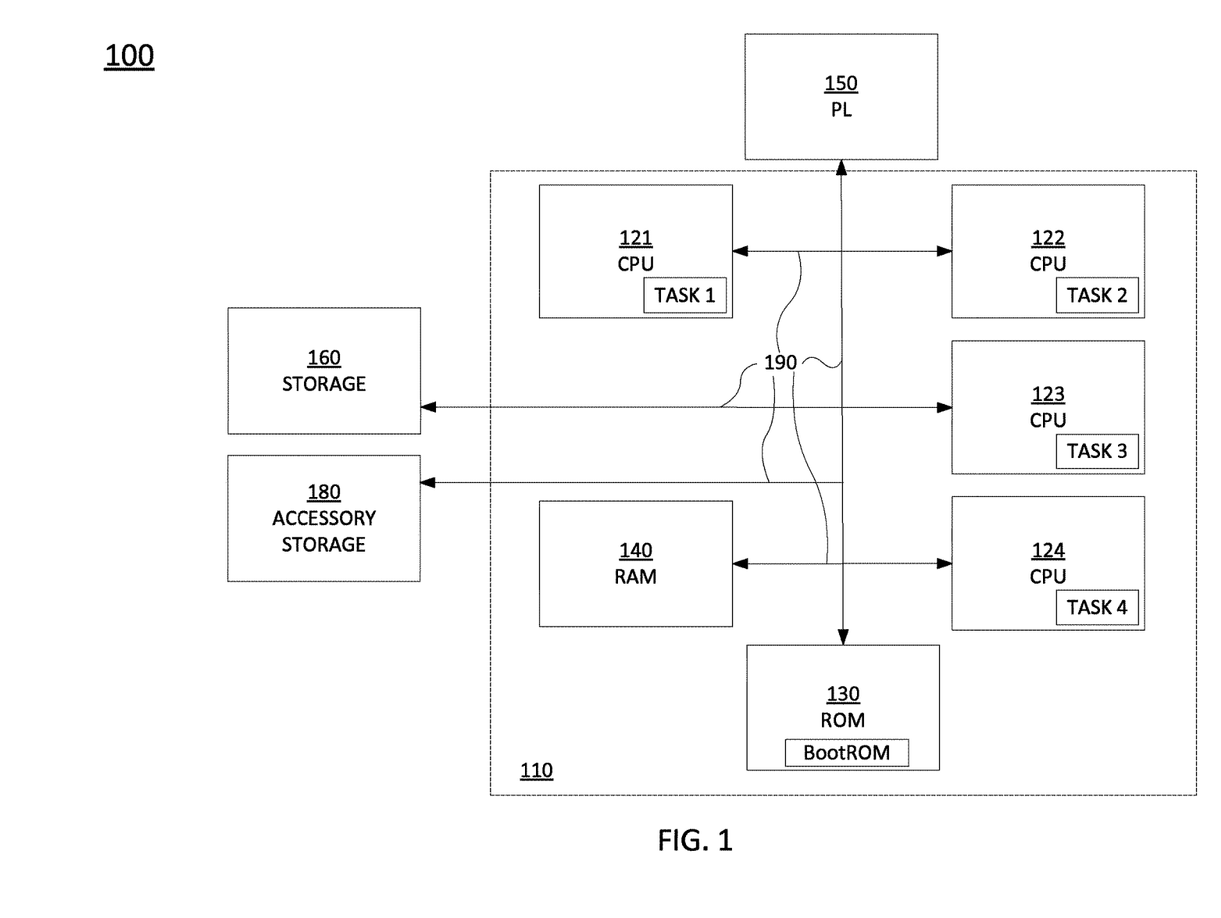
FIG. 1 illustrates a block diagram of a device.

As an example, FIG. 1 illustrates a block diagram of an exemplary device 100. For example, device 100 may comprise a single chip 110 having four processors (CPUs), or cores 121-124. Device 100 also includes on-chip non-volatile memory, e.g., ROM 130, and memory 140, e.g., volatile memory which may comprise RAM, synchronous dynamic RAM (SDRAM) and so forth. Device 100 may also include programmable logic (PL) 150, such as a field programmable gate array (FPGA), and storage devices, such as storage 160, e.g., a magnetic or optical drive, a hard disk drive (HDD), a solid state drive (SSD) or other non-volatile memory or storage device, and accessory storage 180, e.g., a universal serial bus (USB) drive, a secure digital (SD) card, a remote server, peripheral or other connected device that is accessible via a network, and the like. Although not specifically illustrated, it should be understood that device 100 may include numerous other components such as input/output devices, network interface components, and so forth.

In one embodiment, low-level startup software, such as BootROM, is stored within ROM 130. In a first example, when device 100 comes out of reset and/or is powered on, a first processor, processor 121, accesses a location within ROM 130 according to an address stored within a register of CPU 121. In one example, the address is hard coded into the register of CPU 121 when the chip 110 is manufactured or prior to deployment of the chip within device 100, and cannot be changed. The address points to a specific location within the ROM 130 where the BootROM program resides, e.g., it is the first address within ROM 130 where the code for the BootROM begins. In addition, prior to deployment of chip 110, the BootROM code is loaded into the ROM 130 at the location designated by the same address stored by processor 121. In this way, processor 121 will consistently and predictably access the BootROM in ROM 130 upon startup and/or when coming out of reset.

In this first example, processor 121 may begin to execute the BootROM program that it retrieves from ROM 130. For example, execution of the BootROM code may cause processor 121 to perform one or more common startup tasks, which may include: performing a power on self test (POST), initializing memory 140, retrieving an image of a higher level startup program, e.g., retrieving a first stage boot loader (FSBL) from ROM 130, storage 160 or accessory storage 180, decrypting the image of the FSBL, decompressing the FSBL, authenticating the FSBL, setting up programmable logic (PL) 150, e.g., writing an image to PL 150 such that it is in a known state when the operating system is brought online, and so forth.

The initialization of the memory 140 may comprise writing a known pattern to one or more memory blocks within memory 140 and calculating error correction code (ECC) bits for the memory block(s). For example, the use of error correction codes hardens the system against bit flips, unauthorized memory writes and so forth. However, ECC bits must be recalculated at the boot stage. For ECC to work, the memory must first be in a known state. Thereafter, every write to the memory results in an update to the ECC bits. Accordingly, the initialization of the memory is generally one of BootROM processes that the system performs at startup.

Similarly, the loading of the FSBL into operating memory 140 may comprise several related tasks. For example, the FSBL must first be retrieved from a particular location. For instance, the FSBL may be stored at a different location in ROM 130, in storage 160, e.g., on a hard drive, or in accessory storage 180, e.g., on a USB drive, on a network drive, and so forth. In one example, processor 121 may select from among the different locations to search for a FSBL. For instance, there may be a default FSBL stored in ROM 130, but in executing instructions of the BootROM processor 121 may first attempt to locate a FSBL in accessory storage 180. If present, the startup will proceed using the FSBL found in accessory storage 180. Otherwise, the startup will revert to loading the default FSBL stored in ROM 130. In any case, the FSBL that is selected may be authenticated, e.g., by using a SHA256 hash algorithm to verify the integrity of the FSBL and to confirm that it has not been corrupted. In addition, the FSBL may be compressed, to save disk space, and may also be encrypted. Thus, it may be necessary to first decompress and decrypt the FSBL before it can be loaded into operating memory 140. For example, the FSBL may be encrypted using an AES256 or other cipher. Thus, a SHA256 hash signature and/or an encryption/decryption key may be first retrieved, e.g., from storage 160 from accessory storage 180 or from an eFuse or other register in order to authenticate and decrypt the image of the FSBL.

Alternatively, or in addition, in accordance with the present disclosure, execution of the BootROM code by processor 121 may cause processor 121 to send instructions to one or more of the other processors 122-124 to perform additional tasks. For instance, the additional tasks that may be assigned to other processors may include any one or more of the same exemplary tasks mentioned above that may be performed by processor 121. It should be noted that in one example, the one or more additional tasks that are assigned to the other processors 122-124 comprise tasks that are not performed by processor 121 itself. As an example, execution of BootROM by processor 121 may cause processor 121 to initialize a first portion or block of memory 140 and to further send instructions to processor 122 to retrieve, authenticate and/or decrypt a FSBL, e.g., from storage 160 and/or accessory storage 180. Execution of BootROM by processor 121 may also cause processor 121 to send instructions to processor 123 to initialize a second block of memory 140. Notably, as technology advances, the sizes of memories continue to grow. Thus, significant improvements can be made in the time it takes to complete the BootROM process by having different cores initialize blocks of memory in parallel. Execution of BootROM by processor 121 may also cause processor 121 to send instructions to processor 124 to perform yet another task, such as retrieving and writing an image to programmable logic 150. For example, processor 124 may retrieve the image from accessory storage 180 to load into programmable logic 150.

Further to the present example, after processors 121 and 123 complete initialization of the respective blocks of memory 140, and after processor 122 performs all steps to retrieve, decompress, decrypt and authenticate the FSBL, the FSBL is ready to be loaded into memory 140. Thus, in one instance, execution of BootROM code by processor 121 may further cause processor 121 to load the FSBL into memory 140. For example, the BootROM code may cause processor 121 to instruct processor 122 to load the FSBL into memory 140 at some time after it is determined that the initialization of the memory blocks in memory 140 is complete.

Notably, in accordance with the present disclosure numerous different variations in the division of task assignments between the processors 121-124 are possible. Thus, the foregoing examples are provided for illustrative purposes only. In this regard, it is also noted that a chip manufacturer may have a labeling scheme for the cores of a CPU, e.g., in a quad-core CPU: core 0 (the $1^{st}$ core), core 1 (the $2^{nd}$ core), core 2 (the $3^{rd}$ core), and core 3 (the $4^{th}$ core). However, the above examples referring to processor 121 as a "first processor" do not assume that processor 121 is core 0. In other words, as used herein, the terms "first," "second," "third," etc., do not refer to a specific physical arrangement or any particular labeling scheme. In addition, although four processors 121-124 are illustrated in the example of FIG. 1, the present disclosure is not limited to any particular number of processors. In particular, examples of the present disclosure may utilize any chip that includes two or more processors. In addition, in some examples of the present disclosure not all of the available processors need to be invoked during the low-level startup process. Thus, for instance, the completion of BootROM may utilize only three processors, whereas the device may include six processors. In addition, the foregoing describes an example where a first processor, e.g., processor 121, accesses BootROM from non-volatile memory 130 and sends instructions to the other processors on chip 110. However, this is merely a first configuration that is possible in accordance with the present disclosure.

As an additional example, each of the processors 121-124 may independently retrieve all or a portion of the BootROM and execute respective portions of the BootROM. For example, each of the processors 121-124 may have an internal register which is accessed after the device 100 is powered on or after a reset. In one example each register stores an address which directs the respective processor to a portion of ROM 130 containing the BootROM program. For instance, each register may store a different address which points to a different portion of ROM 130. In addition, each portion of the ROM 130 storing BootROM code may include respective BootROM code for execution by a different processor. In another example, each of the processors may access the same starting address in the ROM 130, and continue to access the BootROM code sequentially until encountering instructions which are specifically identified for performance by that particular processor. In any case, each processor will retrieve its own instructions to begin performing one or more tasks. Each processor 121-124 may thus begin performing its own task(s) independently.

The tasks performed by the different processors 121-124 may be performed in parallel without regard to the pace of completion of tasks assigned to other processors. However, at least some tasks may be dependent upon one another. For example, a processor that is tasked with retrieving a FSBL and loading the FSBL into memory 140 may not be able to complete this task until another processor initializes all or a portion of the memory 140. Thus, in such instances the BootROM may include instructions to enable each of the processors 121-124 to communicate with one another for handling concurrency issues and to have an awareness of the state of completion of one or more tasks being performed by the other processors.

As mentioned above in connection with the example where processor 121 sends instructions to the other processors to perform additional tasks, the assignment and division of different tasks to different processors may have numerous variations. The same types of tasks, and the same number of different permutations of task assignments are thus possible with respect to this additional example where each of the processors 121-124 individually accesses the BootROM code. As still a further example that may be illustrated in reference to FIG. 1, a first processor, such as processor 121, may begin executing the BootROM code and send instructions to other processors to perform additional tasks. However, the instructions may take the form of sending pointers to additional locations within ROM 130 which contain BootROM code for execution by the additional processor(s) in order to perform the additional task(s).

The foregoing description relates primarily to BootROM processes. However, the present disclosure also includes multi-threaded (e.g., multi-core) startup processes at higher layers. For example, execution of the BootROM may result in the loading of a FSBL, or "secondary program loader" (SPL) into an on-chip memory 140. When the FSBL is loaded into memory 140, control of the chip typically is passed to the FSBL for continuing the startup operations. For example the FSBL may be responsible for accessing and loading a second stage boot loader, for retrieving and loading an operating system image and accompanying data, which may include the kernel, modules, setting files, such as initrd (which is a Linux file for enabling a bootloader to load a RAM disk), and the like, and for starting a number of input/output devices or peripherals, e.g., a monitor and keyboard, among other possible responsibilities. In addition, the BootROM process typical only initializes a portion of memory 140 necessary to load the FSBL. Thus, the FSBL may be responsible for initializing the remainder of the memory 140 such that it is ready for operation when the operating system and higher level functions are activated. Accordingly, some embodiments of the present disclosure may comprise the division of these additional tasks among the different processors 121-124. For example, processor 121 may execute FSBL in memory 140. The instructions may result in processor 121 assigning processor 122 to continue to initialize further portions of memory 140 while assigning to processor 123 the task of retrieving, authenticating, decompressing, decrypting and/or loading an operating system image and accompanying data into the memory 140. For example, the operating system may be stored on a storage device such as storage 160 or accessory storage 180, while hash signature(s) and cryptographic keys may be retrieved from the same or different locations, e.g., from a different USB storage device, a secure digital (SD) card, and so forth. As another example, multiple threads of the FSBL may be maintained directly by each of the processors 121-124. For instance, each of processors 121-124, or each of a subset of processors 121-124 may directly access the FSBL code in memory 140 (e.g., without another processor as an intermediary) and execute different instructions contained therein to perform different respective tasks.

Figure 2:
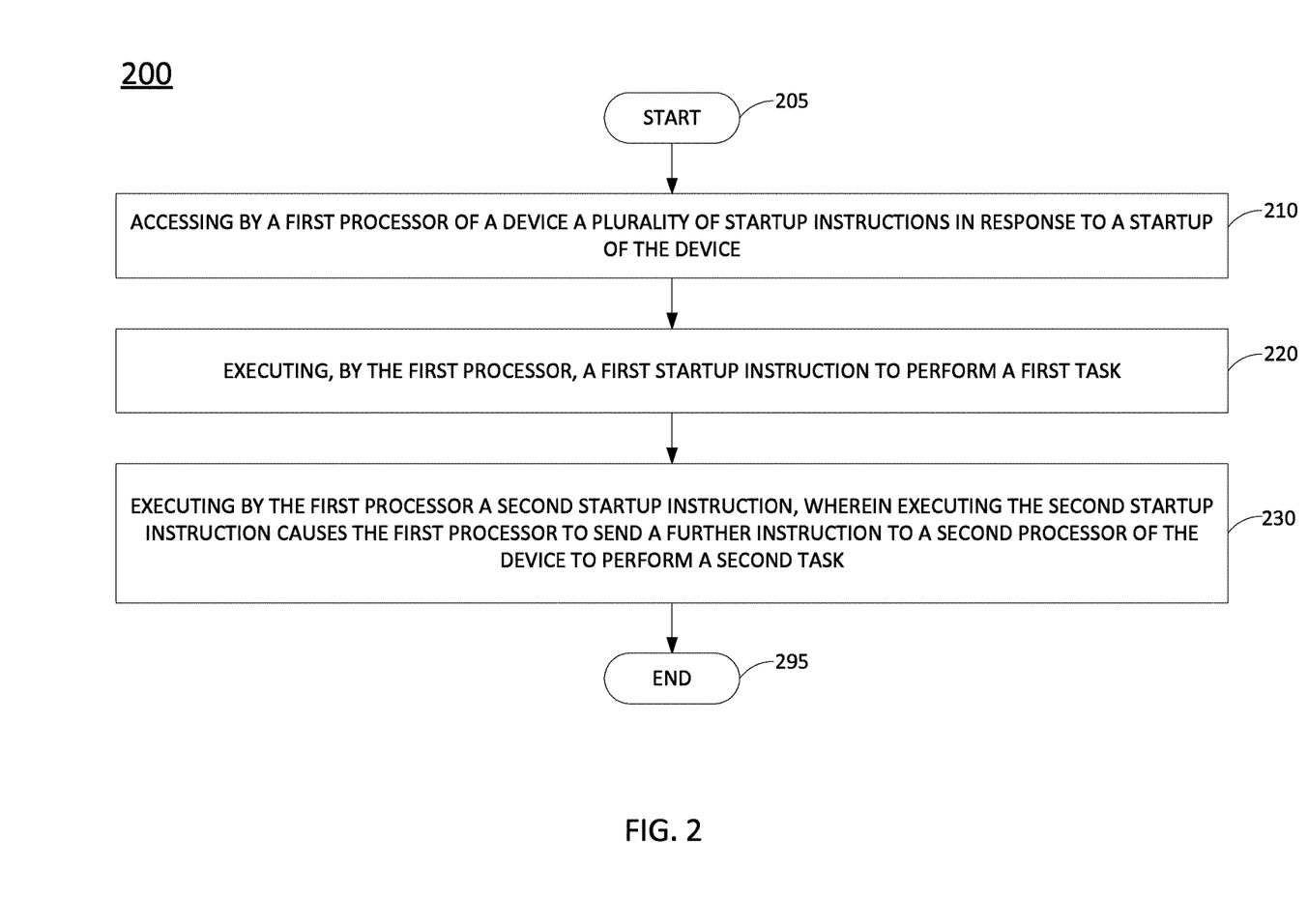
FIG. 2 illustrates a block diagram of a method for executing a plurality of startup instructions for a device.

To further aid in understanding the present disclosure, FIG. 2 illustrates a block diagram of an exemplary method 200 for executing a plurality of startup instructions for a device. For example, any one or more of the steps, operations or functions of the method 200 may be implemented by a first processor of a device or chip that includes two or more processors. For instance, method 200 may be performed by one of processors 121-124 of FIG. 1. Method 200 may also be implemented by a general purpose computer having one or more processors, a memory, etc. as illustrated below in FIG. 4, specifically programmed to perform the steps, functions and/or operations of the method. For illustrative purposes, the method 200 is described below as being performed by a first processor of a device that includes two or more processors. The method starts in step 205 and proceeds to step 210.

In step 210, the first processor accesses a plurality of startup instructions in response to a startup of a device that includes the first processor. For instance, the startup of the device may comprise a powering-on of the device, a system reset, or the like. In one example, the first processor may determine where to access the plurality of startup instructions based upon an address stored in a register of the processor, e.g., a reset vector stored locally by the processor. For instance, the address may direct the first processor to a particular location within a non-volatile memory, e.g., a ROM, containing the startup instructions. In one example, the startup instructions may comprise BootROM code, as described above. In another example, the startup instructions comprise code of a first stage boot loader (FSBL) or secondary program loader (SPL). In such case, step 210 may therefore comprise the first processor accessing startup instructions from an on-chip memory (e.g., RAM) where an image of the FSBL is already loaded.

At step 220, the first processor executes a first startup instruction of the plurality of startup instructions to perform a first task. For example, as described above, exemplary tasks may include: performing a power on self test (POST), initializing operating memory, retrieving an image of a higher level startup program, e.g., a first stage boot loader (FSBL), retrieving a cryptographic key, decrypting the image of the FSBL, decompressing the FSBL, authenticating the FSBL, setting up programmable logic (PL), and so forth. In addition, in the case where the startup instructions are instructions of a FSBL, the exemplary tasks may alternatively or additionally comprise: initializing a remainder of the memory that has not been previously initialized, retrieving, authenticating, decompressing, decrypting and/or loading an operating system image and accompanying data into the memory, starting input/output devices or peripherals, and so forth. In one embodiment, the first task may simply comprise managing the low-level startup process and coordinating the assignment of additional task to other processors. In other words, the abovementioned typical startup tasks may be performed by the other processor(s), while the first processor simply functions as a manager of the process.

At step 230, the first processor executes a second startup instruction of the plurality of startup instructions. In one example, the second startup instruction causes the first processor to send a further instruction of a second processor of the device to perform at least a second task. For instance, step 230 may comprise the first processor providing an instruction, or instructions, to the second processor to perform any one more typical startup tasks, such as: performing a power on self test (POST), initializing operating memory, retrieving an image of a higher level startup program, e.g., a first stage boot loader (FSBL), retrieving a cryptographic key, decrypting the image of the FSBL, decompressing the FSBL, authenticating the FSBL, setting up programmable logic (PL), and so forth. In addition, in the case where the startup instructions are instructions of a FSBL, the exemplary tasks assigned to the second processor may alternatively or additionally comprise: initializing a remainder of the memory that has not been previously initialized, retrieving, authenticating, decompressing, decrypting and/or loading an operating system image and accompanying data into the memory, starting input/output devices or peripherals, and so forth. Alternatively, step 230 may comprise providing an address or pointer to the second processor to access one or more additional instructions to perform one or more additional tasks. For example, the second processor may access the plurality of startup instructions in a non-volatile memory or in volatile memory to retrieve its own instruction, as directed by the first processor. In any case, at least a portion of the first task performed by the first processor and at least a portion of the second task performed by the second processor occur at the same time. Different combinations of tasks divided between the first and second processors are possible. As just one example, the first task for the first processor at step 220 may include initializing a memory, while the second task performed by the second processor may include retrieving, decompressing, decrypting and/or authenticating an image of a first stage boot loader (FSBL). In any case, the method 200 comprises a multi-threaded startup process where at least two processors of a single device perform respective startup tasks (e.g., multiple "threads") for bringing the device online.

Following step 230, the method proceeds to step 295 where the method ends.

Figure 3:
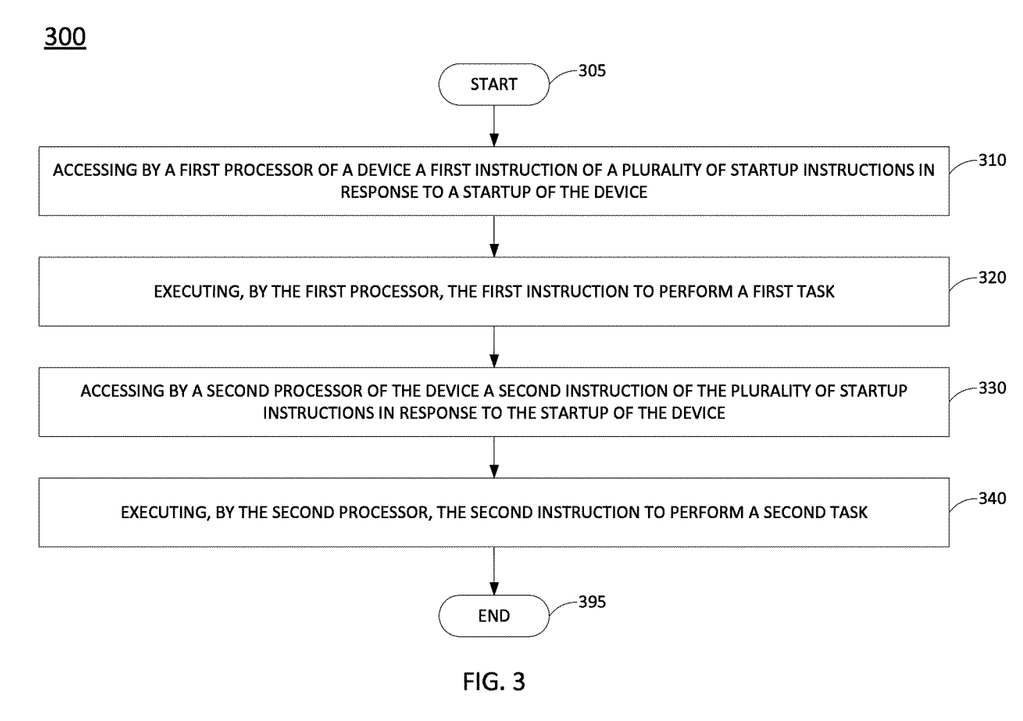
FIG. 3 illustrates a block diagram of an additional method for executing a plurality of startup instructions for a device.

FIG. 3 illustrates a block diagram of an additional method 300 for executing a plurality of startup instructions for a device. For example, any one or more of the steps, operations or functions of the method 300 may be implemented by a device or chip that includes two or more processors. For instance, method 300 may be performed by device 100 of FIG. 1. Method 300 may also be implemented by a general purpose computer having one or more processors, a memory, etc. as illustrated below in FIG. 4, specifically programmed to perform the steps, functions and/or operations of the method. For illustrative purposes, the method 300 is described below as being performed by a device that includes two or more processors. The method starts in step 305 and proceeds to step 310.

At step 310 a first processor of the device accesses a first instruction of a plurality of startup instructions in response to a startup of the device. For instance, the startup of the device may comprise a powering-on of the device, a system reset, or the like. In one example, the first processor may determine where to access the plurality of startup instructions based upon an address stored locally by the processor, e.g., a reset vector stored in a register. For instance, the address may direct the first processor to a particular location within a non-volatile memory, e.g., a ROM, containing the startup instructions. In one example, the startup instructions may comprise BootROM code, as described above. In another example, the startup instructions comprise code of a first stage boot loader (FSBL) or secondary program loader (SPL). In such case, step 310 may therefore comprise the first processor accessing startup instructions from an on-chip memory (e.g., RAM) where an image of the FSBL is already loaded.

At step 320, the first processor executes the first instruction to perform a first task. For example, as described above, exemplary tasks may include: performing a power on self test (POST), initializing operating memory, retrieving an image of a higher level startup program, e.g., a first stage boot loader (FSBL), retrieving a cryptographic key, decrypting the image of the FSBL, decompressing the FSBL, authenticating the FSBL, setting up programmable logic (PL), and so forth. In addition, in the case where the startup instructions are instructions of a FSBL, the exemplary tasks may alternatively or additionally comprise: initializing a remainder of the memory that has not been previously initialized, retrieving, authenticating, decompressing, decrypting and/or loading an operating system image and accompanying data into the memory, starting input/output devices or peripherals, and so forth.

At step 330, a second processor of the device accesses a second instruction of the plurality of startup instructions in response to the startup of the device. In one example, the second processor may determine where to access the plurality of startup instructions based upon an address stored locally by the second processor, e.g., using a reset vector. For instance, an address in a reset vector may direct the second processor to a particular location in non-volatile memory/ROM containing the startup instructions. In one example, the address is a same address as that stored by the first processor. However, in another example, the address is a different address which accesses a different location within the non-volatile memory. For instance, the second processor may jump directly to a different instruction, or set of instructions which are designated for the second processor. In another example, the startup instructions comprise code of a first stage boot loader (FSBL) or secondary program loader (SPL). In such case, step 330 may therefore comprise the second processor accessing startup instructions from an on-chip memory (e.g., RAM) where an image of the FSBL is already loaded.

At step 340, the second processor executes the second instruction to perform at least a second task. For example, as described above, exemplary tasks may include: performing a power on self test (POST), initializing operating memory, retrieving an image of a higher level startup program, e.g., a first stage boot loader (FSBL), retrieving a cryptographic key, decrypting the image of the FSBL, decompressing the FSBL, authenticating the FSBL, setting up programmable logic (PL), and so forth. In addition, in the case where the startup instructions are instructions of a FSBL, the exemplary tasks for the second processor may alternatively or additionally comprise: initializing a remainder of the memory that has not been previously initialized, retrieving, authenticating, decompressing, decrypting and/or loading an operating system image and accompanying data into the memory, starting input/output devices or peripherals, and so forth. Different combinations of tasks divided between the first and second processors are possible. As just one example, a first task for the first processor at step 320 may include initializing a memory, while a second task performed by the second processor at step 340 may include retrieving, decompressing, decrypting and/or authenticating an image of a first stage boot loader (FSBL). In any case, at least a portion of the first task performed by the first processor and at least a portion of the second task performed by the second processor occur at the same time. Thus, the method 300 comprises a multi-threaded startup process where at least two processors of a single device perform respective startup tasks (e.g., multiple "threads") for bringing the device online.

Following step 340, the method proceeds to step 395 where the method ends.

It should be noted that although not specifically specified, one or more steps, functions or operations of the respective methods 200 and/or 300 may include a storing, displaying and/or outputting step as required for a particular application. In other words, any data, records, fields, and/or intermediate results discussed in the respective methods can be stored, displayed and/or outputted to another device as required for a particular application. Furthermore, steps or blocks in FIGS. 2 and 3 that recite a determining operation or involve a decision do not necessarily require that both branches of the determining operation be practiced. In other words, one of the branches of the determining operation can be deemed as an optional step.

Figure 4:
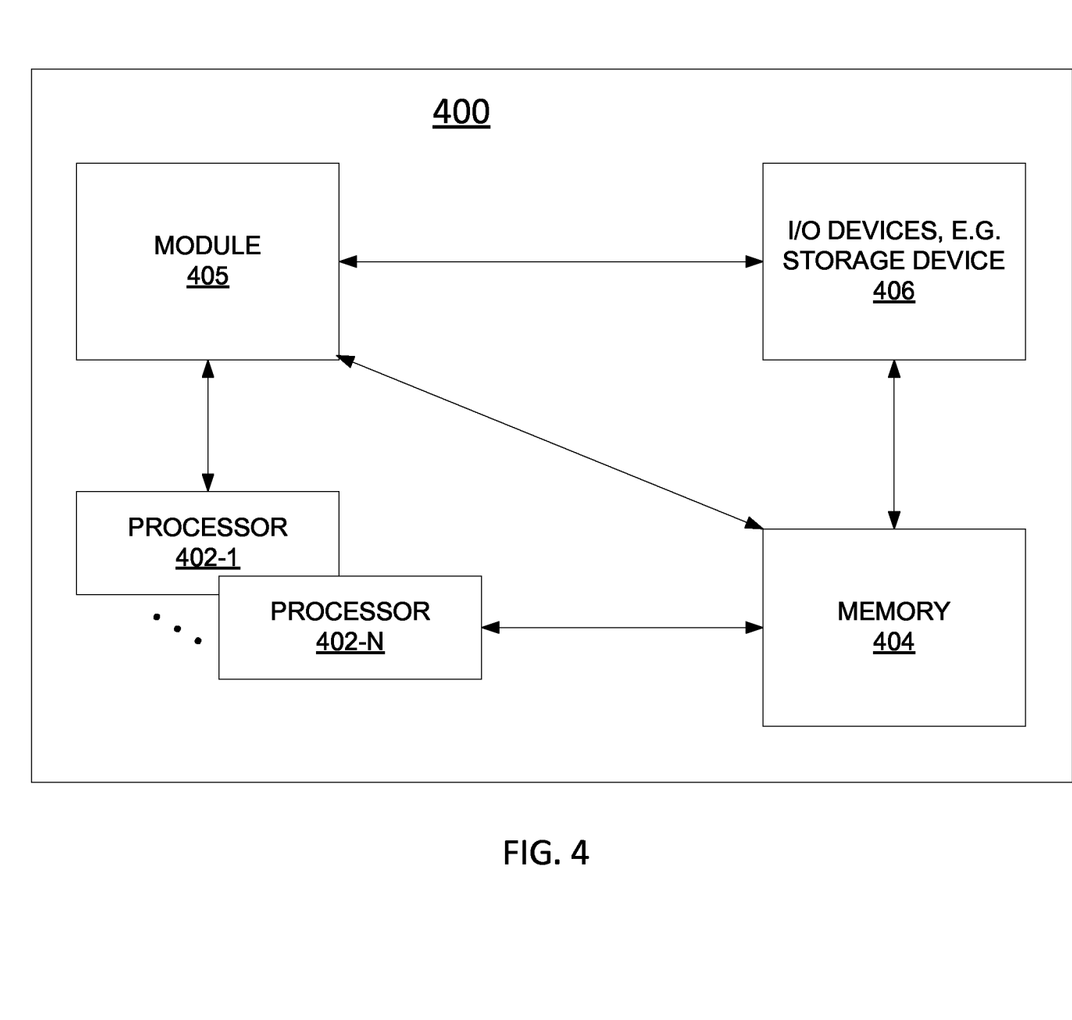
FIG. 4 illustrates a high level block diagram of a general purpose computer, or a computing device suitable for use in performing the functions described herein.

FIG. 4 depicts a high-level block diagram of a general-purpose computer or system suitable for use in performing the functions described herein. As depicted in FIG. 4, the system 400 comprises a plurality of hardware processor elements 402-1-402-N (e.g., a plurality of microprocessors or central processing units (CPUs), which may comprise a dual-core processor element, a multi-core processor element, and the like), a memory 404, (e.g., random access memory (RAM), read only memory (ROM), a disk drive, an optical drive, a magnetic drive, and/or a Universal Serial Bus (USB) drive), a module 405 for executing a plurality of startup instructions, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure one or more hardware processors to perform the steps functions and/or operations of the above disclosed methods. In one embodiment, the present module or process 405 for executing a plurality of startup instructions can be implemented as computer-executable instructions (e.g., a software program comprising computer-executable instructions) loaded into memory 404 and executed by any one or more of the processors 402-1-402-N to implement the functions as discussed above. As such, the present module or process 405 for executing a plurality of startup instructions as discussed above in methods 200 and 300 (including associated data structures) of the present disclosure can be stored on a non-transitory (e.g., tangible or physical) computer readable storage medium, e.g., ROM, magnetic or optical drive or diskette and the like.

While the foregoing describes various examples in accordance with one or more aspects of the present disclosure, other and further embodiment(s) in accordance with the one or more aspects of the present disclosure may be devised without departing from the scope thereof, which is determined by the claim(s) that follow and equivalents thereof. Claim(s) listing steps do not imply any order of the steps. Trademarks are the property of their respective owners.

What is claimed is:

1. A method for executing a plurality of startup instructions for a device, the method comprising:
    accessing, by a first processor of the device, a first startup instruction of the plurality of startup instructions using an address hard coded in the first processor, wherein accessing the first startup instruction is performed in response to a startup of the device;
    executing, by the first processor, the first startup instruction of the plurality of startup instructions to perform a first task;
    accessing, by a second processor of the device, a second startup instruction of the plurality of startup instructions using an address hard coded in the second processor, wherein accessing the second startup instruction is performed in response to the startup of the device; and
    executing, by the second processor, the second startup instruction of the plurality of startup instructions to perform a second task, wherein at least a portion of the first task and at least a portion of the second task are performed at a same time.

2. The method of claim 1, wherein the plurality of startup instructions is stored in a non-volatile memory of the device.

3. The method of claim 1, wherein the plurality of startup instructions is stored in a volatile memory of the device.

4. The method of claim 1, wherein the first task comprises:
    performing a power on self test of the device.

5. The method of claim 1, wherein the first task comprises:
    retrieving a programmable logic image from a storage device; and
    writing the programmable logic image to a programmable logic portion of the device.

6. The method of claim 1, wherein accessing the first startup instruction of the plurality of startup instructions comprises:
    retrieving the first startup instruction of the plurality of startup instructions starting at a particular memory location of a non-volatile memory of the device, wherein an address of the particular memory location is stored in a register of the first processor and is accessed by the first processor at the startup of the device.

7. The method of claim 1, wherein the first or the second task comprises:
    initializing at least a portion of a volatile memory of the device, wherein the initializing the at least a portion of the volatile memory comprises writing a known pattern to the volatile memory.

8. The method of claim 1, wherein the second task comprises at least one of:
    retrieving a programmable logic image from a storage device of the device; or
    writing the programmable logic image to a programmable logic portion of the device.

9. The method of claim 1, wherein the plurality of startup instructions comprises a boot loader program.

10. The method of claim 1, wherein the first task comprises at least one of:
    decompressing a boot loader program that is retrieved from a non-volatile memory or a storage device of the device;
    authenticating the boot loader program; or
    decrypting the boot loader program.

11. The method of claim 10, wherein the authenticating comprises:
   accessing a hash signature from a storage device of the device; and
   verifying an integrity of the boot loader program using the hash signature.

12. The method of claim 10, wherein the decrypting comprises:
   accessing a decryption key from a storage device of the device; and
   decrypting the boot loader program using the decryption key.

13. The method of claim 1, wherein the startup of the device comprises a power-on event or a reset event.

14. The method of claim 1, wherein the same time comprises a time prior to the device operating a first stage boot loader.

15. A non-transitory computer-readable medium storing a plurality of startup instructions which, when executed by a first processor of a device, cause the first processor to perform operations, the operations comprising:
   performing a first task comprising an initialization of a memory, in response to a startup of the device; and
   sending a further instruction to a second processor of the device to perform a second task, wherein:
      at least a portion of the first task and at least a portion of the second task are performed at a same time; and
      the second task comprises writing a programmable logic image to a programmable logic portion of the device.

16. The non-transitory computer-readable medium of claim 15, wherein the programmable logic portion of the device comprises a field programmable gate array (FPGA).

17. An apparatus comprising:
   a first processor;
   a second processor; and
   a non-transitory computer-readable medium storing a plurality of startup instructions, wherein:
      the first processor is configured to access a first startup instruction of the plurality of startup instructions using an address hard coded in the first processor in response to a startup of the apparatus and to execute the first startup instruction to perform a first task;
      the second processor is configured to access a second startup instruction of the plurality of startup instructions using an address hard coded in the second processor in response to the startup of the apparatus and to execute the second startup instruction to perform a second task; and
      the first processor and the second processor are configured to perform at least a portion of the first task and at least a portion of the second task at a same time.

18. The apparatus of claim 17, further comprising a storage device, wherein the second task comprises at least one of:
   retrieving a programmable logic image from the storage device; or
   writing the programmable logic image to a programmable logic portion of the apparatus.

19. The apparatus of claim 17, further comprising a non-volatile memory, wherein the first processor is configured to access the first startup instruction by retrieving the first startup instruction starting at a particular memory location of the non-volatile memory, wherein an address of the particular memory location is stored in a register of the first processor and is accessed by the first processor at the startup of the apparatus.

20. The apparatus of claim 17, further comprising a volatile memory, wherein the second task comprises initializing at least a portion of the volatile memory by writing a known pattern to the volatile memory.

21. The apparatus of claim 17, further comprising a volatile memory, wherein the plurality of startup instructions is stored in the volatile memory.

\* \* \* \* \*